United States Patent [19]
Bayod

[11] Patent Number: 5,809,124
[45] Date of Patent: Sep. 15, 1998

[54] COIN CHARGING SYSTEM FOR MOBILE TELEPHONY

[75] Inventor: Francisco Bas Bayod, Zaragoza, Spain

[73] Assignee: Automocrion Moncayo S.A.., Zaragoza, Spain

[21] Appl. No.: 949,537

[22] Filed: Oct. 14, 1997

Related U.S. Application Data

[63] Continuation of Ser. No. 754,471, Nov. 22, 1996, abandoned, which is a continuation of Ser. No. 658,984, Jun. 4, 1996, abandoned, which is a continuation of Ser. No. 539,489, Oct. 6, 1995, abandoned, which is a continuation of Ser. No. 167,795, Dec. 13, 1993, abandoned.

[30] Foreign Application Priority Data

| Apr. 13, 1992 | [ES] | Spain | 92 007 97 |
| Mar. 4, 1993 | [ES] | Spain | 93 004 35 |

[51] Int. Cl.⁶ .......... H04M 17/00; H04M 11/00; H04M 15/00
[52] U.S. Cl. .......... 379/155; 379/132; 455/407
[58] Field of Search .......... 379/143–155, 379/111, 112, 114, 121, 123, 130, 131, 132; 455/422, 402, 405, 406, 407, 408

[56] References Cited

U.S. PATENT DOCUMENTS

| 5,046,085 | 9/1991 | Godsey et al. | 379/155 X |
| 5,272,747 | 12/1993 | Meads | 379/155 X |
| 5,333,174 | 7/1994 | Sato et al. | 379/155 X |

*Primary Examiner*—Paul Loomis
*Attorney, Agent, or Firm*—Fredrikson & Byron, P.A.

[57] ABSTRACT

Coin charging system for mobile telephony in order to facilitate the making of telephone calls by means of a mobile telephone with a coin charging system, mainly in public transport means such as buses, airplanes, trains, ships etc., the system being provided with normal operation modes as rating device, changing of rate device and verification system to visualize the amounts and time units available. The system is comprised of a control subsystem (1), a coin selecting and charging subsystem (2), a display subsystem (3) and a supply subsystem (4).

20 Claims, 11 Drawing Sheets

*Fig. 5d bis*

Fig. 5e

Fig. 5e bis

COIN CHARGING SYSTEM FOR MOBILE TELEPHONY

This application is a continuation of application Ser. No. 08/754,471, filed Nov. 22, 1996, which is a continuation of application Ser. No. 08/658,984, filed Jun. 4,1996, which is a continuation of application Ser. No. 08/539,489, filed Oct. 6, 1995, which is a continuation of application Ser. No. 08/167,795, filed Dec. 13, 1993.

The present invention, as indicated in the title, relates to a coin charging system for mobile telephony, being adaptable to any apparatus of mobile telephony which uses the present cellular technology, or any other which may be used in the future (for example telephony via satellite); and capable of rating automatically, said rating being susceptible to changes in the chasing quantities be it the initial or that of by passes.

BACKGROUND OF THE INVENTION

It is well known that the communication by telephone is ever more necessary in today's lifestyle. Industries, commerces and even particular persons find themselves more and more necessitated to establish communications, even from places out of offices or homes. On the Other hand, the infra-structure required for giving service of conventional telephony is in any point of the world excessively expensive in order for it to be feasible. This has given rise to the appearance of cordless mobile telephony, the terminals of which can be carried by the user or inside a vehicle while he moves from one point to another. Said mobile telephony systems require that the user be subscribed to the services which to that effect are offered by telephone companies. The problem can arise when a user not subscribed to such services needs to make a call while he is travelling from one point to another, or he is in a place where the conventional telephony cannot offer such a service.

A coin charging system for mobile telephony is known which, although in some part it responds to the needs of the user, presents drawbacks in other aspects as to its capacity and operation.

One drawback of the mentioned system is that the mobile telephone and the corresponding charging system are integrated, forming one single apparatus, which does not allow said system to be adapted to other mobile telephones, thus limiting its efficiency to only one assembly.

On the other hand, said system only accepts one type of coin (Sterling Pound), for which its use will be limited to one specific country.

Another disadvantage of said system is that once the coins are introduced and the communication is established, it does not return the coins which are not used. Moreover, as soon as the number is launched by the user, the charging starts without taking into account the possibility of the line being busy or a delay in answering the call.

Another drawback of the known system is that the rate per minute is prefixed and cannot be changed in an easy manner by non-specialized people. This obligates the user of the system to ask for help from an expert involving the corresponding economic costs therewith.

DESCRIPTION OF THE INVENTION

In order to solve the problems hereinabove exposed, the coin charging system for mobile telephony, as the object of the invention, is proposed which can be adapted to any mobile telephone on the market at present and to other mobile telephony services which might appear in the future by means of slight modifications. This system accepts at present five types of coins as to their value and is easily adaptable to any other group of coins, being new coins of the same country or foreign coins.

The system is capable of returning the coins not used, since it has a lung of eight coins.

The system presents two options of charging: by constant passes (for example each $1/14$ of minute which is a period similar to that used by the Telephone Company in its chargings) or by variable passes, based on detection of the rating signal which the operating company sends to the mobile telephone. In the first case, the charging starts to be effective when the communication with the subscriber to whom the call is made is established, due to the detection made on the audio signal coming from the mobile telephone.

In the second case, the charging is made according to the cadence marked by the rating signal sent by the operating company and read from the transceiver by the present charging system.

The pass and the initial ratings are easily modifiable without the need of invention of specialized personnel.

Additionally the system offers the possibility of monitoring the quantity of money accumulated in the collecting box, the total number of passes of the telephone company in the communication, the total connection time (per $1/14$ of minute) prior to the establishment of the communication, the number of calls and the total time in communication (per $1/14$ of minute), said values being capable of being initialized by the person in charge of maintenance.

Optionally, the system provides a remote monitoring system as to its state and in two versions: active and passive.

The system comprises a mechanical and an electrical part.

The mechanical part utilized comprises a coin selector which detects the value of the coins inserted and rejects non-legal coins, and a retaining charging and returning mechanism totally controlled by a micro-controller (incorporated in the electrical part) by means of a motor for positioning, a number of photoelectric sensors of position and passage detection of the coin and an electromagnetic coil for charging. The components of this part of the system are conventional and hence reference will be made to them in relation to the whole system.

The electrical part of control is based on a micro-controller with capacity to respond to the needs of the operation of the system. This micro-controller exerts control on a display device, a number of elements for communication with the person in charge of maintenance, a coin mechanism with a selector and a system of mobile telephony.

The system of mobile telephony in turn consists of the mobile telephone itself, a power supply device thereof, an interface for audio signals, a connection detecting circuit, a keyboard activating and blocking circuit, a circuit for detection of multifrequency tones (optional) and an interface for the reception of the rating signal.

The microcontroller is connected to: interfaces for the photo-electric sensors of position and charging of the temporary coin storage; interfaces for a user unit consisting of coin-return push-button and programming keys; circuits for processing signals associated to a mobile telephone (These signals are: audio signals processed by a squarewave amplifier, a high order pass-band filter, an analog switch for the audio signal transmitted by the micro-telephone; supply signals processed in the connection detection circuit, relay for supply to the transceiver and auxiliary control circuitry; control signals towards the transceiver (keyboard blocking and activating circuit) and control signals towards the micro-telephone directly connected to the micro controller.); auxiliary electronics for the operation of the motor and the movement of the temporary storage of coins; and circuit for activating a coil which controls (opens/closes) the charging gate; interfaces for the signals generated by the coin selector for determining the validity of the coins inserted.

The interfaces for the photo-electric sensors of position and charging of the temporary storage of coins permit the microcontroller to determine the position of the coin storage and the status of the coins collected, The interfaces of the user unit permit connection between the switch and the push-buttons to the microcontroller. Also connected to the latter are devices for programming phone numbers.

The audio signal received by the micro-telephone which is the signal received by the user who is selecting a call, is optionally sent to a high order pass-bank filter which only maintains the frequency band -corresponding to the signals of status of each call (call in progress, busy, wrong number, etc.). Either the filtered signals, or the original audio signal where no filter exists, is sent to the squarewave amplifier which generates a squarewave whose frequency is similar to that of the first (principal) harmonic wave of the audio signal received, which is read by the microcontroller for determining whether a signal for the status of the call is being produced or not The analog switch for the audio signal transmitted by the micro-telephone (the signal transmitted by the user who is effecting the call) prevents said signal or a party thereof from reaching the squarewave amplifier, which could cause a false detection of the audio signal received.

The power supply relay of the transceiver is controlled by the microcontroller through an auxiliary control circuitry consisting of a buffer and a number of transistors which amplify the power of the digital signal generated by the microcontroller.

The connection detection circuit controls the current intensity consumed by the transceiver indicating to the microcontroller when the connection is established either making or receiving calls.

The keyboard activating the blocking circuit is a digital switch which impedes the passage of the control digital signals from the micro-telephone to the transceiver which are generated with a key on the micro-telephone is pressed. Consequently, the transceiver is prevented from detecting which keys have been pressed; thus, blocking the possibility of making calls. This circuit is also used by the microcontroller for sending the necessary codes to the transceiver for activating the process of generating the rating signal.

The control signal towards the micro-telephone contains the information which the transceiver sends to the screen of the micro-telephone. This information may include the numbers dialed of a phone number or also, depending on the control codes sent to the transceiver from the keyboard activating and blocking circuit, any include rating information based on charging units accumulated from the beginning of the call. The information is read by the microcontroller and used for charging. Said control signals are connected to the microcontroller for their direct reading.

The auxiliary electronics for the operation of the motor consists of a number of transistors in bridge arrangement controlled by another series of transistors whose function is that of changing voltage level, which are activated by the microcontroller. This arrangement allows for the movement of the motor in directions of revolution, as well as stops.

The circuit for activating the coil which controls the collecting gate consists of a transistor controlled by the microcontroller and protected by a diode.

The interfaces for the signals generated by the selector of coins are connected to the microcontroller; thereby, the latter reads the values of said signals for determining whether the coins inserted are valid and what values they have.

DESCRIPTION OF DRAWINGS

FIG. 4a is a partial flowchart that corresponds to the NORMAL mode of the system.

FIGS. 5b, 5c, 5d bis, 5e and 5e bis are partial flowcharts inter-related with each other and with the diagram of FIG. 5a. FIGS. 5a, 5b, 5c, 5d and 5e show the operation in NORMAL mode in rating by constant pass. FIGS. 5a, 5b, 5c, 5d bis and 5e bis show the operation in NORMAL mode when the rating signal of the operating company is used.

EXAMPLE OF AN EMBODIMENT

Prior to identifying the system, a brief description is made of the communication interfaces between the main constituent elements of a mobile telephone used by said system in order to obtain or transmit information to a transceiver.

Mobile telephones used as a complement of the rating system are composed of two different elements: the transceiver and the microtelephone. Between the two apparatus an interchange of information is established by means of a cable which comprises various conductors, among which generally one can distinguish: the transmission data conductor (CDT), which carries the corresponding information to the pressed keys in the microtelephone; the reception data conductor (CDR); and the data control conductor (COD), used by the transmitter in order to synchronize the transmitted signals either through CDT, or through CDR.

Figure 1:
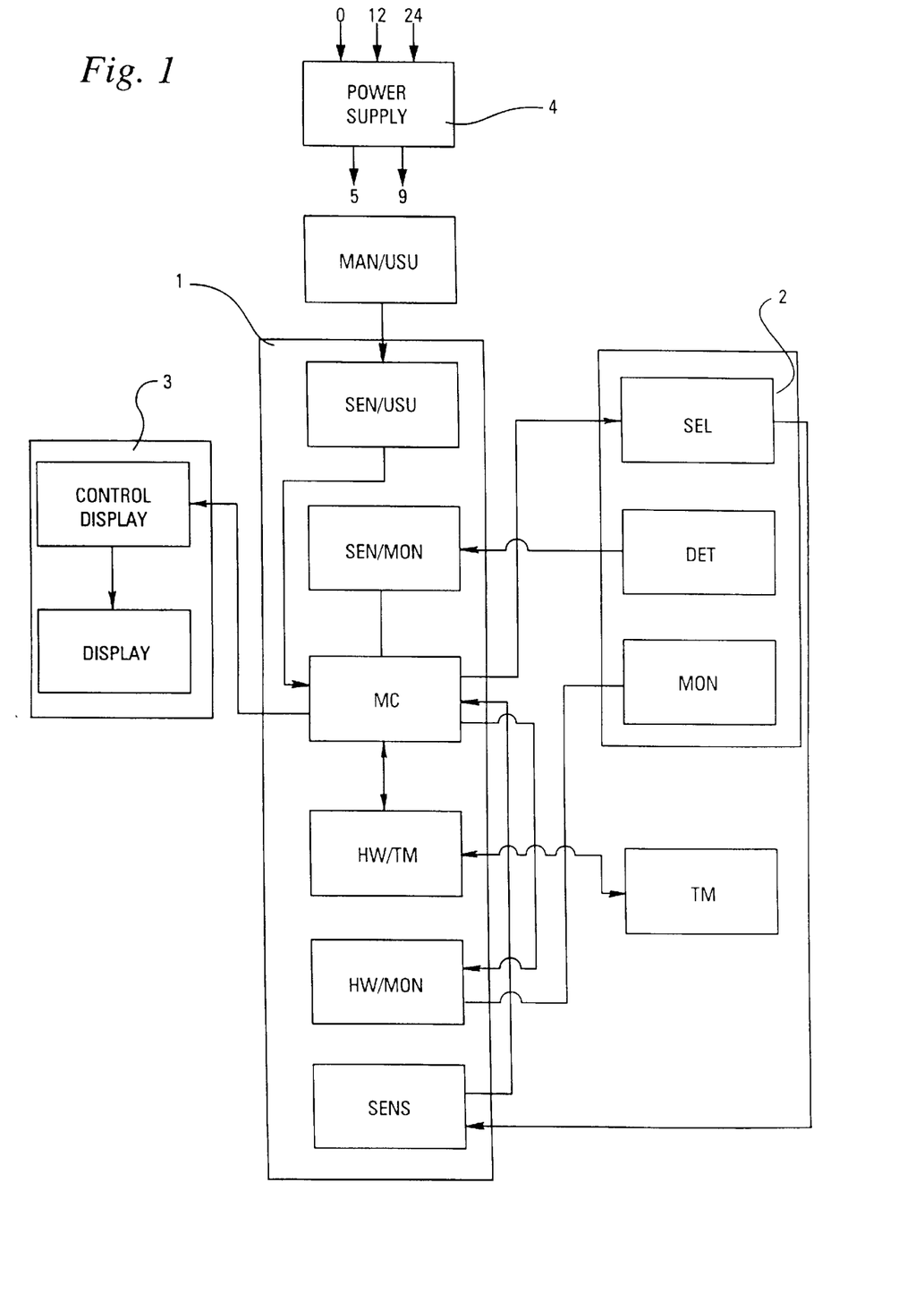
FIG. 1 represents the global block diagram of the charging system object of the invention.

As it can be observed from FIG. 1, the charging system object of the invention comprises a control subsystem (1), a coin selection and charging subsystem (2), a display subsystem (3) and a supply subsystem (4). The function of each subsystem is hereinafter disclosed.

The supply subsystem contains the necessary circuitry for filtering and converting the current coming from the supply batteries to the working currents of the system.

The MAN/USU block includes the different control units that the user utilizes in order to change tariffs, displays totals, store telephone numbers and recover coins. This block is connected to SEN/USU which contains the adequate interfaces for the signals coming from the subsystem which permit the detection of the actions of the user by the control subsystem.

SEN/MON contains the interfaces for the signals coming from photoelectric sensors of positioning and detection of charging (DET), situated in the coin charging and returning mechanism (MON).

The block MC includes the microcontroller, the auxiliar circuitry thereof and the interfaces for the different logic gates of input/output.

HW/TM includes the supply relay of the mobile telephone (TM) and the corresponding interface circuitry (RE); the interface for audio signals which includes an analogical switch for the audio signal transmitted by the microtelephone (IAA) and a circuit for squaring amplifier (AMO) optionally connected to a high order pass-band filter (F) for the received audio signal; the connection detecting circuit (DEC); the keyboard activating and blocking circuit (CABT); the multifrequency tone detecting circuit (CDTMF) (optionally); and the interface for CCD signal of the mobile telephone (TM), said signal being used in case of using the rating signal sent by the operating company.

HW/MON includes a transistor bridge circuit for activating the motor of the coin mechanism (MON) and the circuit of activating the charging coil.

SENS includes the interfaces for the signals coming from coin selector (SEL,) the which provides information about the coins inserted by the user in the system.

The display subsystem (3) contains the circuitry for the control of a liquid crystal display or a 7 segment LED display, used in order to show the digits of the inserted amounts, rates and accumulated amounts, being directly connected to the control subsystem.

The system offers three operating modes denominated NORMAL, RATING and VERIFICATION. The NORMAL mode permits the device to operate as a rating device. In order to select the operating mode there is an internal selector (s1) of three positions (see FIG. 2) which is located inside the housing of the cabin and is only accessible for maintenance. The mode RATING allows, according to the position of a second selector (s2) one to change either the initial rating, or the quantity per pass. The rating variation is carried out by using two push-buttons, one for increasing them (p1) and another for decreasing them (p2). These control units are located in the MAN/USU block.

The mode VERIFICATION is used for displaying the collected amount since the last initialization, the total communication time (in 1/14 minute), the total time of connection prior to the communication (in 1/14 minute) the total number of the telephone company passes and the total number of calls. Additionally, it permits the zeroing of the accumulated amounts. The term telephone company pass is equivalent to charging units. This information is sent by a telephone company to the transceiver of the mobile telephone through a control channel. This happens when communication is established between the person who is calling and the one who receives the call, this of course being conditioned to that the cellular system has, in fact, this feature incorporated. This information indicates approximately how many units will be charged to the caller, and it is stored in the transceiver of the mobile telephone which uses this information in order to update the charging units already accumulated which may be consulted by the user through the microtelephone or other external systems. In order to calculate the approximate cost of a call, it would be sufficient to multiply the number of accumulated charging units by the price of each charging unit which is established by the telephone company. The selection of display of the collected amount or the total communication time is carried out by means of selector s2. The selection of the total time of connection prior to the communication and the total number of calls is carried out by means of the same selector s2, while the push-button p2 is activated. The selection of the total number of telephone company passes is activated by pressing the return switch while selector s2 is moved. The zeroing of the collected amount or the accumulated quantities related to time and the number of calls is carried out with the same two push-buttons used for changing the ratings. Optionally, in this mode the contact phone number for remote monitorization stored in the memory can be modified.

While the switch s1 is in NORMAL mode or in VERIFICATION mode, if it is moved to RATING mode and the switch s2 is in initial quantity position, the initial quantity previously established will appear on the screen and can be modified using push-buttons p1 and p2. In contrast if the switch s1 is in NORMAL or in RATING mode, it is moved to VERIFICATION mode, and the quantity shown on the screen will be the quantity accumulated in the cash box since the last zeroing if the switch s2 is in position of accumulated quantity, or the total communication time if s2 is in the other position. On the other hand, if by moving s2 the push-button p2 is maintained active, the total number of calls or the total time of connection prior to the communication will be displayed. By pressing the return switch, while selector s2 is moved, the total number of telephone company passes will be obtained on the screen. Being in this mode, if push-button p1 and then p2 are pressed subvertically in an interval of three seconds, the accumulated amount depending on the position of switch s2-, or the four accumulated quantities related to the total number of calls, passes in communication, connection time prior to the communication and the total communication time are initialized to zero.

Moving the switch s1 to NORMAL mode, the device can be used as a rating device for telephone calls.

Figure 2:
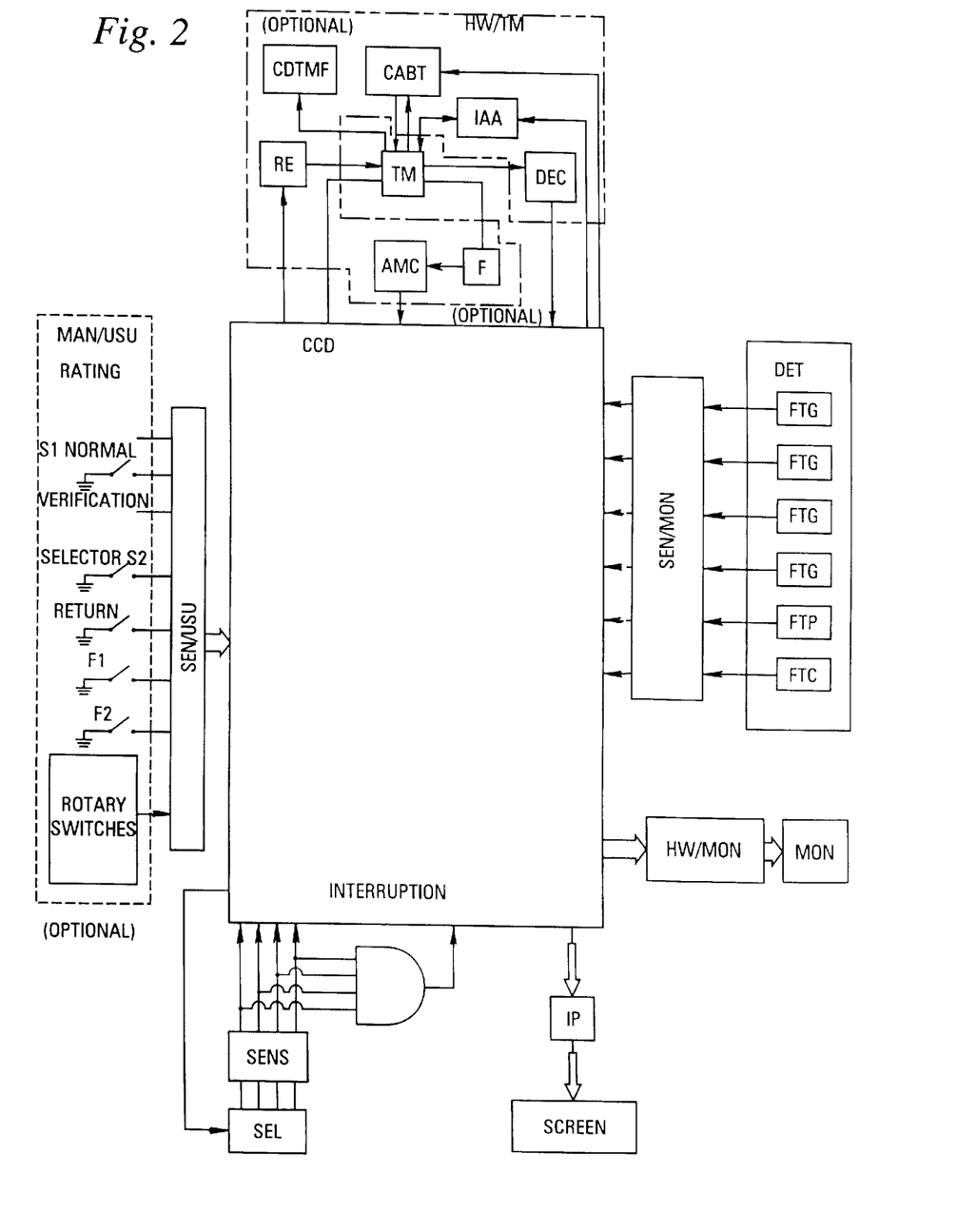
FIG. 2 represents a schematic diagram in which the principal components of the system are observed.
Figure 3:
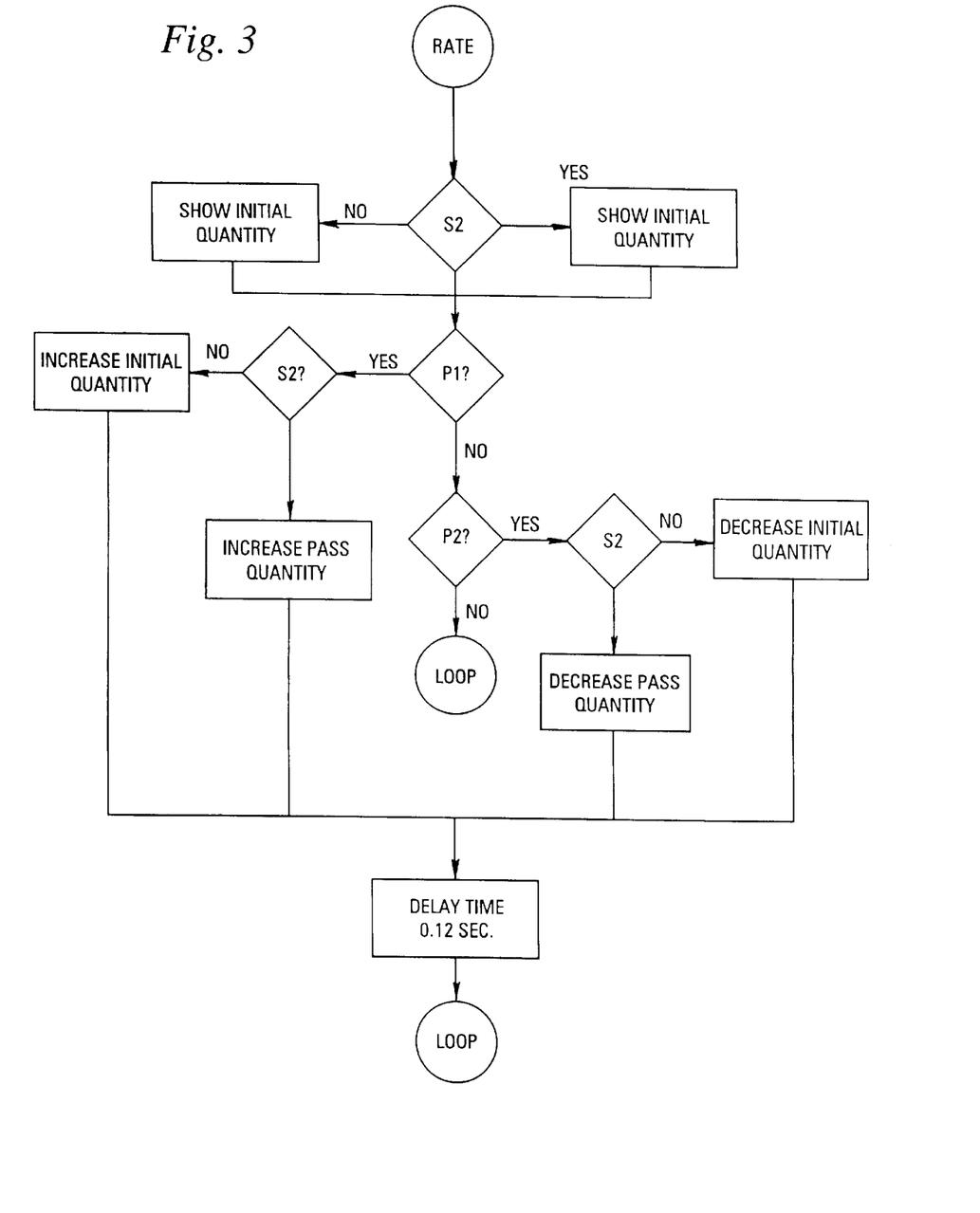
FIG. 3 is a flowchart that corresponds to the RATING mode of the system.

Referring to FIGS. 2 and 3, the rating mode is hereinafter analyzed. The operation in RATING mode in order to change the quantity per pass is similar to the process of changing the initial quantity, except that the change is made in incremental values which are different in one case with another for which only the first case will be disclosed. FIG. 3 presents the states of the system according to which the changes of the initial quantity are carried out.

Both the rating per pass, and the initial quantity are defined in fractions of peseta, or any other foreign coin. The decimal fraction of the utilized coin, in which the rating increments are defined, can be easily modified in the control program, and it is being possible to work with tenths, hundredths, etc.

In order to change the rating per pass, the operator situates the switch s1 in RATING position and s2 in position quantity per pass. In this situation, the microcontroller (MC) will read a logical zero in the terminal RATING and a logical 1 in the terminal VERIFICATION for which it will enter in mode RATING. Immediately, the microcontroller (MC) will take from the memory the value of the rating per pass, convert it to BCD code and put it digit by digit in the digit bus which is connected to the screen interface circuit (IP), showing said value on the screen. For each digit to be shown, the microcontroller will send a control pulse so that said digit presented in the bus is memorized and shown on the screen.

Once the screen shows the rating, the microcontroller will continuously check the push-buttons p1 and p2. An activated push-button will cause the microcontroller to detect a logical zero in the corresponding input, while the value read when deactivated will be logical 1.

Having p1 pressed, the microcontroller detects its activation, increases internally the quantity per pass and shows the same on the screen. It then enters in a delay loop of 0.12 second which serves to allow that the speed of increasing to be adequate for human perception after which the state of the push-button is again verified. The same process is done on push-button p2, except that the quantity per pass is decreased.

The process of increase/decrease can be used as many times as desired until the position of one of the switches is changed.

Figure 4:
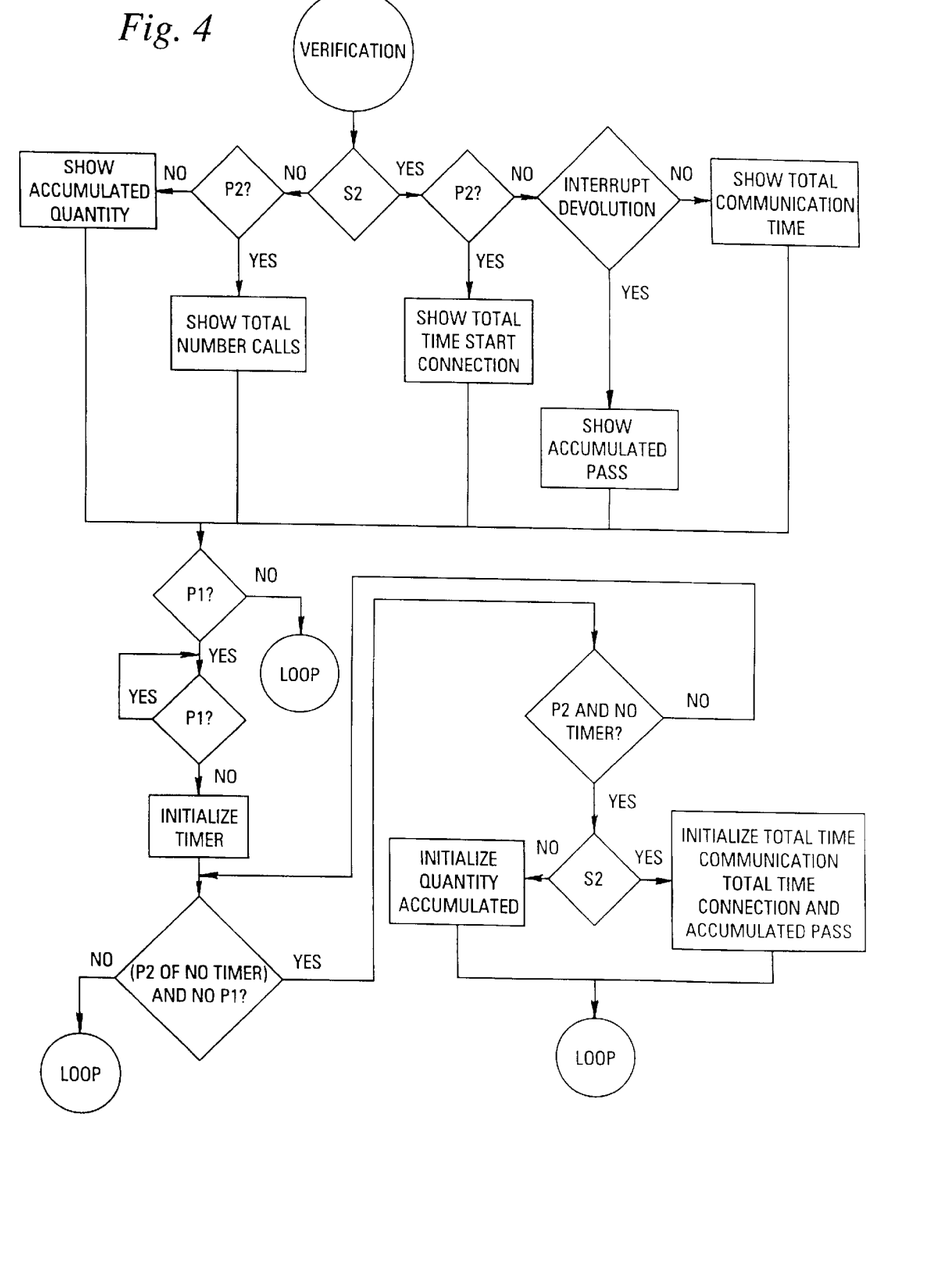
FIG. 4 is a flowchart that corresponds to the VERIFICATION mode of the system.

Referring to FIGS. 2 and 4 the VERIFICATION mode is hereinafter analyzed.

Moving s1 to the mode VERIFICATION, the VERIFICATION terminal acquires a logical zero value and the terminal RATING will then have logical 1 value. If s2 is in the position of accumulated quantity, said quantity is shown on the screen the same way as hereinabove described. The microprocessor will then wait for the reception of the initialization sequence. If p1 has been pressed and the pressing of s2 is delayed more than three seconds, or the expected sequence of p1–p2 is not received, the amount is then not initialized since after pressing p1, the microcontroller enters in a delay loop of three seconds, during which only the pressing of p2 will be accepted. Any other operation returns the system to the initial state. The same process is carried out with the accumulation related to the total number of calls, passes in communication, connection time prior to the communication or the total time in communication, if s2 is in the position of the adequate auxiliary push-buttons (p2 or the returning switch). The zeroing of said accumulated quantities is made simultaneously in all. This situation is maintained until switch s1 is changed.

Referring to FIGS. 2, 5a, 5b, 5c, 5d, 5d bis, 5e and 5e bis, the NORMAL mode in which the system operates as a rating device is hereinafter analyzed.

Figure 5A:
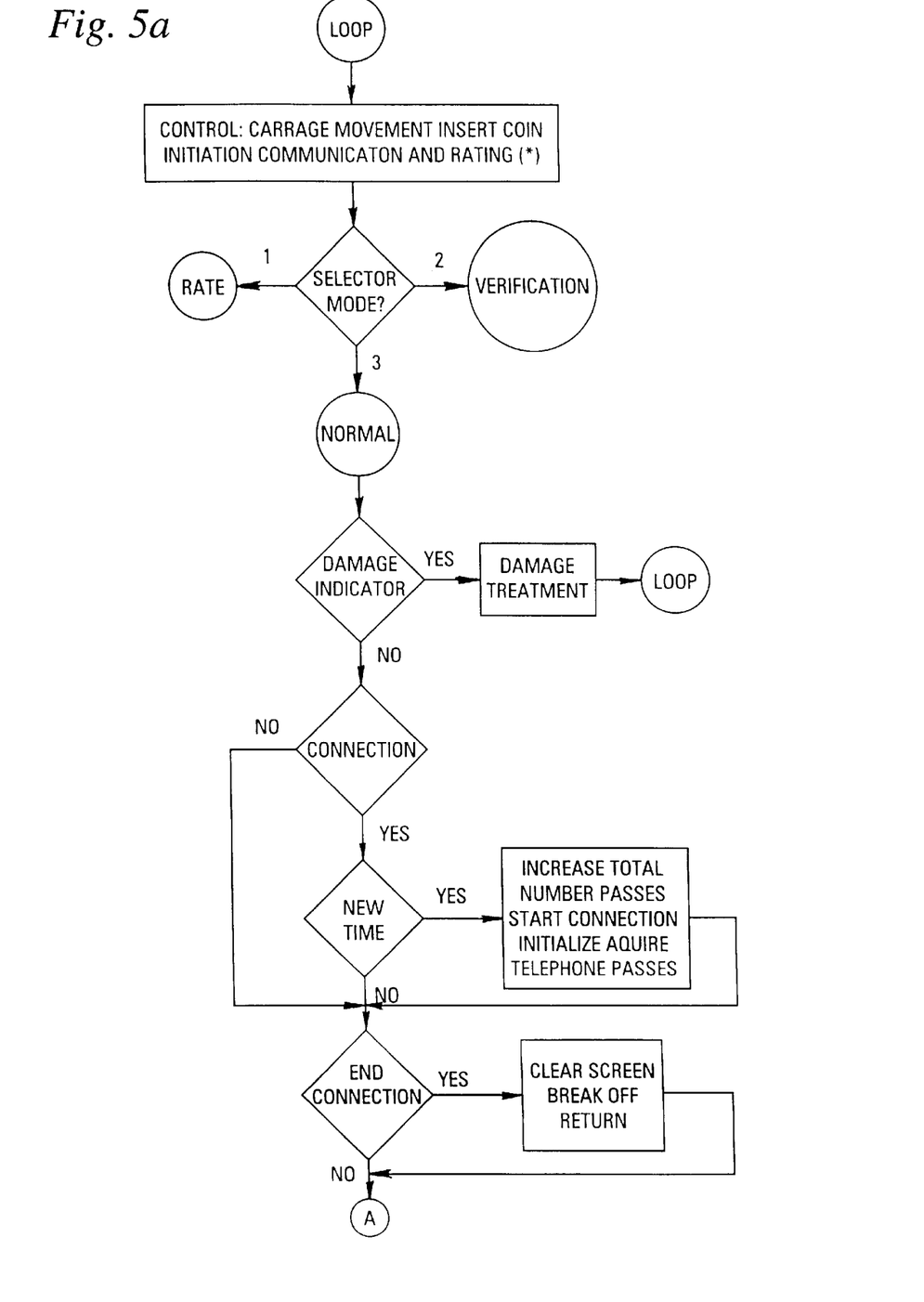
Figure 5B:
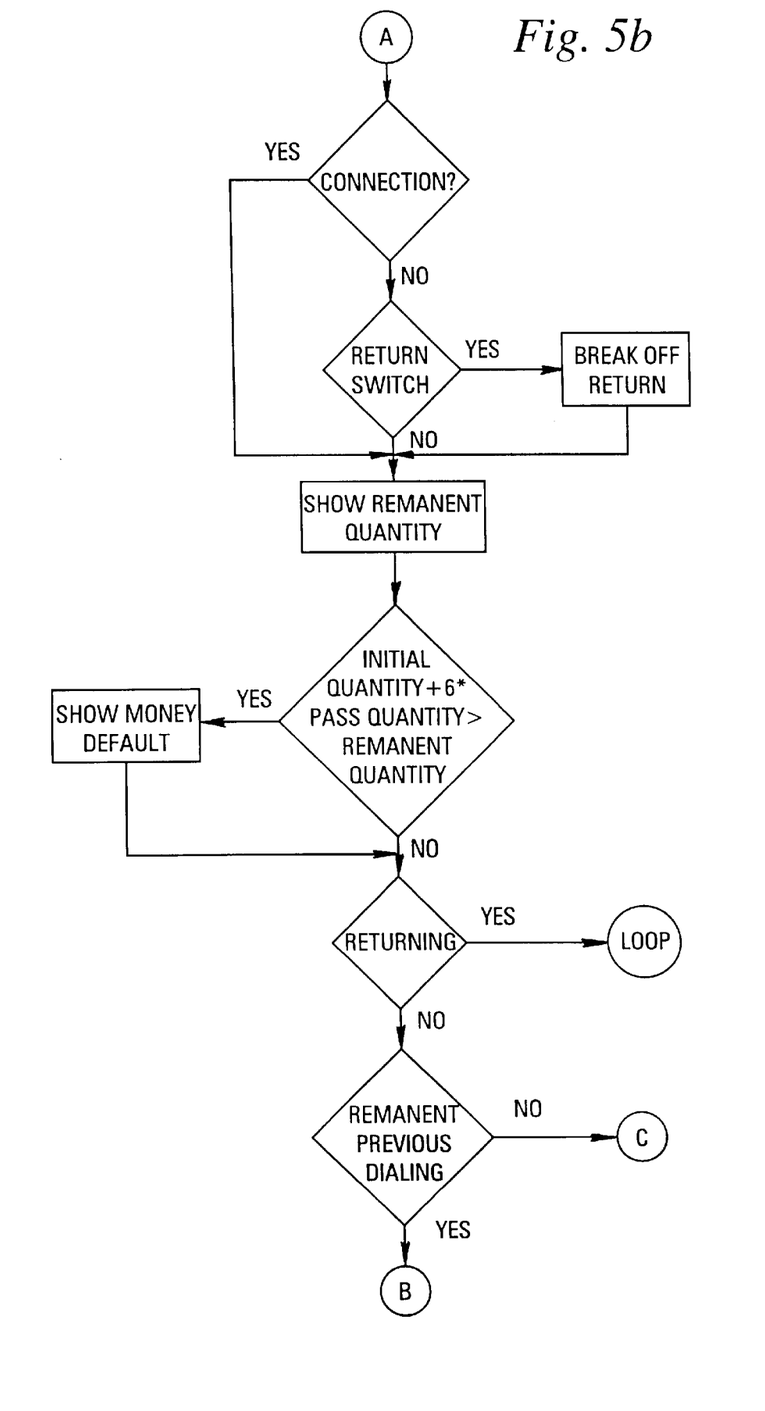

The switch s1 must be kept in NORMAL mode. In this mode, the screen will remain blank, the supply relay of the mobile telephone (RE) being deactivated, for which the former will not receive supply, and thus the microtelephone will remain off. In this situation, the system will permit the insertion of coins by the user, which will be accepted or rejected by means of selector (SEL), depending on if the latter recognizes them as valid or not.

INSERTION OF COINS

The insertion of valid coins increases the remnant quantity which is shown on the screen. The microtelephone will not be activated while said quantity is not sufficient for starting a communication.

The coin mechanism has a coin storage controlled by the microcontroller (MC). The storage is movable being activated by means of a direct current motor. One of the slots of the storage is aligned with output selector (SEL) and with the charging opening from which the coins fall into the cash-box. The charging opening is activated by means of a coil controlled by the microcontroller (MC). In the initialization of the system, the microcontroller (MC) would have positioned the coin mechanism (MON) in order to receive from the selector (SEL) one coin in the first slot.

Once the user has inserted a coin, the selector (SEL) determines its validity during the running course of the same. If it is not valid, it is automatically rejected. If it is valid, the selector (SEL) guides the coin until the corresponding slot of the coin mechanism (MON) and generates a single code for each type of coin which will appear in a bus of four bits which is read by the microcontroller.

The microcontroller should respond to said code with a confirmation signal, within a determined time margin outside of which the coin is rejected.

A logical circuit receives the signals generated by the selector (SEL) when it receives a valid coin and generates an interruption signal which is connected to one of the interruption terminals of the microcontroller (MC). This interruption gives rise to the execution of a routine which detects the value of the coin, generates the confirmation signal and starts a one second timing, this latter being a time limit during which all the process of selection must have been carried out. The to confirmation signal will be maintained active while some bit of the bus of the values generated by the selector is maintained active.

Figure 5C:
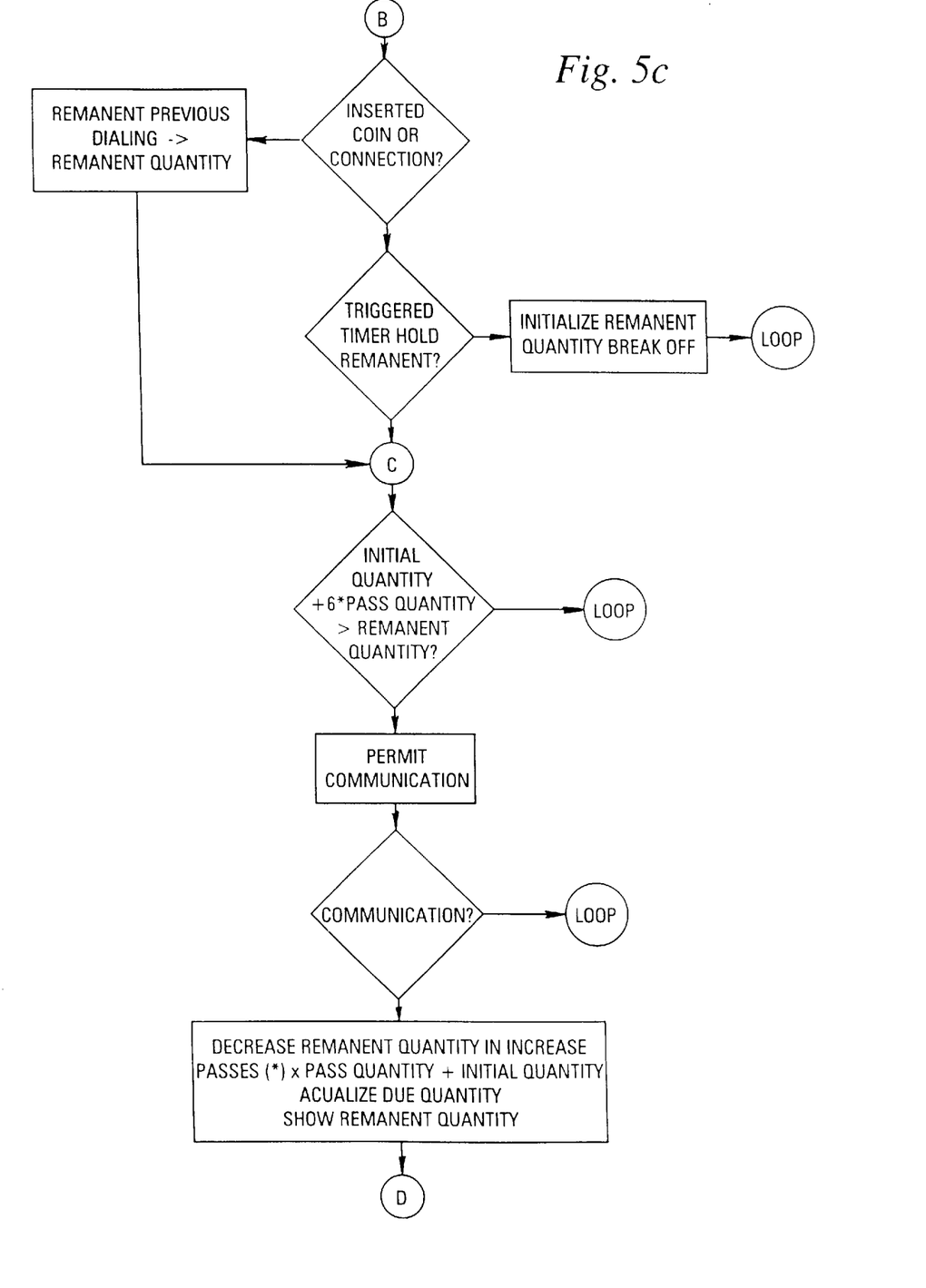
Figure 5D:
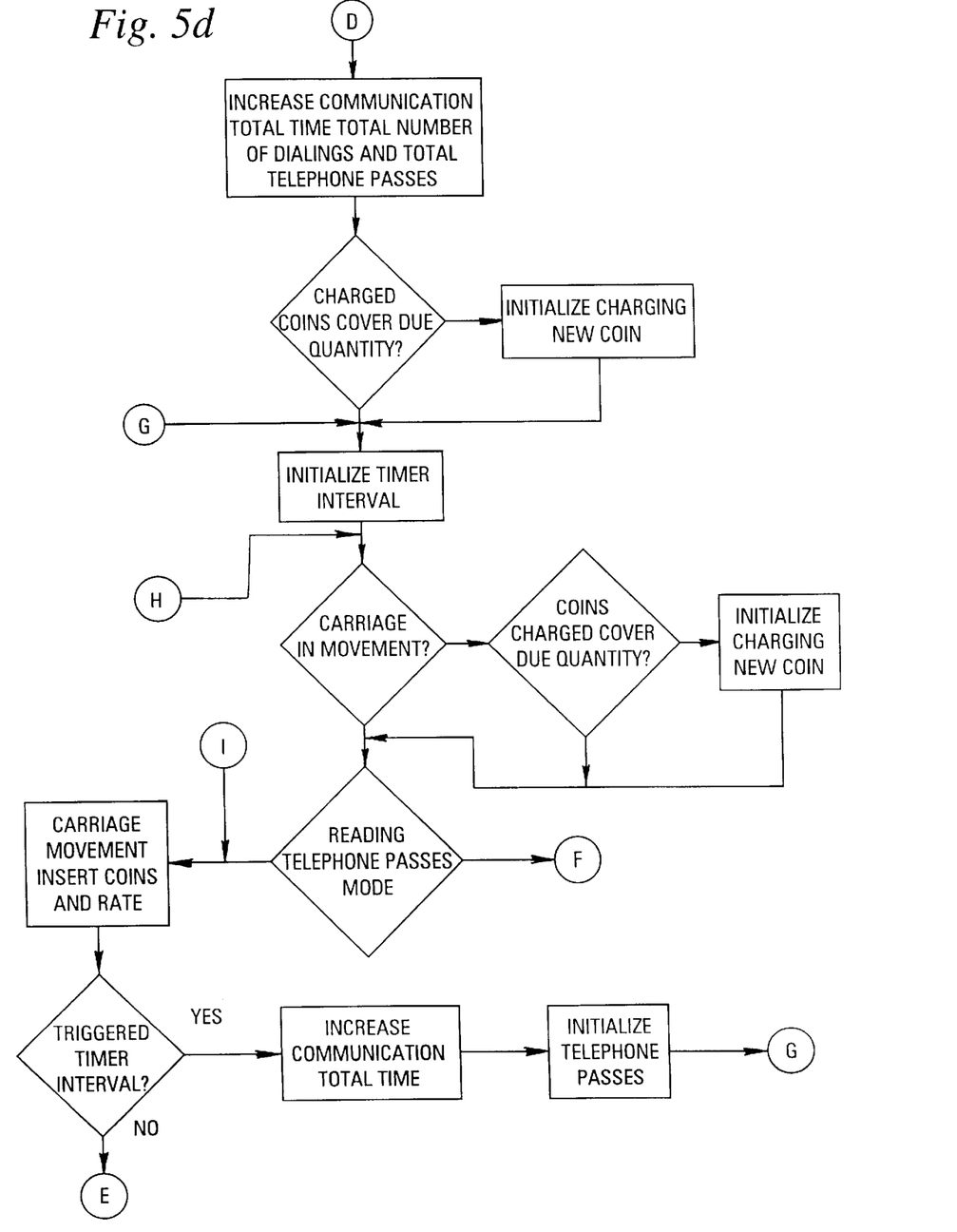

The activating process of the microtelephone and the subsequent actions are shown in FIGS. 5c and the following figures depending on if the remnant amount is less or more than the necessary quantity in order to permit the communication.

After having detected the end of the generated signal by the exit of the coin from the selector (SEL), the microcontroller (MC) increases the value of the remnant quantity displays the same on the screen as explained in the RATING mode; resets the state of the system; looks for the position of the closest empty slot; determines the coin of maximum value which will be selected during the following charging to be carried out; and deactivates the reception of coins. Immediately it enter in a loop in which the control of the motor of the mechanism is executed, in order to place the empty slot, previously selected, on the charging opening. The microcontroller (MC) will use the information generated by the photo-transistor, of the rough positioning (FTG), in order to place the slot in said position and the phototransistor of precise positioning (FTP) in order to center the slot on the same.

Once the positioning is finished, the microcontroller reactivates the reception of coins and the process will continue indefinitely.

STARTING OF THE COMMUNICATION

The process of monitorization of the communication is observed in FIGS. 5c and the following figures. Once the user has introduced the amount of money sufficient for covering the initial amount and the subsequent passes at the beginning of the communication, the microcontroller (MC) commands to relay (RE) of supply to the mobile telephone in order to supply, current to the latter, with which the microtelephone will be activated and will permit the user to start the communication. The process of introducing coils will continue as previously explained.

Parallel to the process of coin insertion and the movement of the mechanism, the microcontroller (MC) will carry out another activity in order to establish the moment in which the communication with the subscriber who is being called, is made.

The connection detecting circuit (DEC), which is based on the fact that the supply current intensity consumed by the transceiver when transmitting is more than said intensity during stand-by, permits determine the moment in which the user sends the dialed number and the connection starts. The circuit consists of a comparator which generates a logical 1 value when said supply current exceeds a prefixed limit, being maintained at a low level in the other case. The output of this circuit is read by the microcontroller (MC) which determines the state of the connection.

Once the state of connection is reached and detected, a monitorization state of the beginning of communication is started which different depending on if the rating is carried out by constant pass or by variable pass.

In the case of constant pass rating, the interface for audio signals (squaring amplifier (AMCA) with or without pass band filter (F) and the analogical switch (IAA) is used to determine the instant in which the communication is started.

The audio signals sent to the microtelephone after dialing and sending the desired number, before connection between subscribers are formed by a periodic sequence of tones and silences in a similar manner as that of the signals generated by conventional telephony. The duration of the periods can oscillate however that of the periods of silence will in no way exceed 5 seconds. The tone is generated by a combination of sinusoidal waves whose maximum frequency component is in the neighborhood of 500 Hz. Once the communication has started, said signals give way to others of a totally, non-periodical nature.

In order to detect the instant in which the connection is produced, the microcontroller (MC) checks continuously if the received signals are periodic and have a maximum frequency component close to 500 Hz.

This is done by means of a periodic interruption which will interrupt the execution of the main program with an approximate frequency of 7000 Hz. This interruption will detect the state of the audio signal received by the microtelephone. The interface for audio signals assures that the signal received by the microcontroller (MC) can be read and treated by the latter.

The anologic switch (IAA) for the audio signal transmitted by the microtelephone, is used to cancel the effect which this signal produces on the audio signal received, while periods of tones are being detected, said signal being interrupted during said periods. To do so, the microcontroller (MC) activates the control signal of said circuits in such a manner that the signal does not appear at the output, which impedes interference with the audio signal received. The squaring amplifier (AMC) generates square wave of a similar period as that of the first main harmonic of the audio signal received. This signal is optionally treated by a pass band filter (F) in order to obtain a sinusoidal signal with a frequency similar to that of said harmonic.

The action taken by the microcontroller (MC) will be determined at every moment if the received audio signal corresponds to a tone period or to one of silence or communication. The microcontroller will initiate a timing each time one tone period is ended, be it due to a silence period or to the establishment of communication as defined. If the microcontroller detects a prolonged lack of tone (approximately ⅐ minute), it will estimate the communication has started and will act accordingly. The error in the estimation of the instant of initiation of the communication will be less than ⅐ minute. The sampling frequency (7000 Hz) permits detection without error of the components of frequency higher than 600 Hz.

If the charging is made according to the telephone company rating signal, the system must periodically; each 1/14 minute) activate the transmission of the number of passes accumulated by the transceiver from the beginning of the communication. This information is sent by the transceiver through terminal CDR towards the microtelephone, and is controlled by said transceiver through terminal CCD.

The activation of the transmission is made by sending through terminal CDT a determined code of activation which depends on the brands and models of mobile telephones. To do so the keyboard activation and blocking circuit (CABT) should be used. Under normal conditions this code should be sent through the keyboard, however CABT permits the microcontroller to carry out this function automatically. The reception of the code by the transceiver gives rise to sending the number of passes accumulated on the microtelephone screen, said number being read and decoded by the microcontroller (MC) in order to determine the beginning of the communication and calculate the amount to be charged at each moment.

The keyboard activation and blocking circuit (CABT) consists of a current follower for digital signal and a control logic associated thereto. Said logic permits the circuit, depending on the binary value of its control inputs, stay in three possible output stages: logical zero, logical 1 or acting as a follower. The circuit imbricates as interface for the signal received by transceiver which can be, depending on the state of the control inputs of CABT: 1) the signal sent by the microtelephone, logical zero; or 3) logical 1.

In any of the two types of rating there exists the problem that the detection of the beginning of the communication is carried out with a delay with respect to the instant in which it his really started for which it may give rise to free calls. In order to avoid this situation, by means of the keyboard activation and blocking circuit (CABT), it is impeded that the connection is rapidly interrupted.

The method used for avoiding free calls consists of maintaining the keyboard unblocked in the tone period of calls and blocked during the periods in which there is no tone. In this manner, the end of connection can only be produced in said tone periods, or once the beginning of the communication has been detected and the corresponding quantity has been charged. The blocking of the keyboard is obtained by maintaining the output of CABT at logical 1 with which the signals generated by the keyboard are not transmitted to the transceiver.

The keyboard blocking circuit (CABT) may as will be used in other cases where it is necessary to impede the use of the keyboard by the user or it is required to send information to the transceiver without using the keyboard.

After having detected the beginning of the communication, in any of the two forms of rating, the microcontroller (MC) will decrease the quantity corresponding to the charging from the quantity inserted by the user, and will start a new timing period of 1/14 minute, upon which period the charging of the rating per constant pass and the reception of the information regarding accumulated passes in rating per variable pass are based (FIG. 5c). At the same time the microcontroller will command the motor to move to the charging position previously determined, and will calculate the position of the next charging slot. The flowcharts of FIGS. 5d for rating according to the passes of the telephone company, and 5d bis, for the rating per constant pass, correspond to the process, which should be followed in order to carry out the charging of coins. The charging of a new coin will start at the moment when a timing period has ended and with that the total value of the previously charged coin is consumed. The validation of the charging is done when the charged coin has activated the phototransistor for charging of a coin (FTC), situated at the exit of the charging slot.

After the end of the period of present timing, it is acted in a different manner depending on the type of rating used. In the case of rating per constant pass, the remnant quantity will be decreased by the value of one pass, this quantity, being defined by the user in the RATING mode. In the case of rating per variable pass, the transmitter will be activated in order to send information to the number of accumulated passes, this information will be read and the number of passes occurred from the last reading will be determined, decreasing the remnant quantity by the corresponding value.

After having up-dated the remnant quantity, the new value will be shown on the screen, it will be determined if it is necessary to charge a new coin and a new period of timing will start. This process will be repeated until the user pushes the hung up key on the microtelephone, the connection is ended by external causes or the last inserted coin is consumed. If the quantity is really reduced under the determined value, the device will notify this showing on the display the "–" sign next to said remnant quantity.

In the case of charging according to the telephone company ratings, there are two different options: that the charging will follow exactly the evolution of said rating signal, or that said signal is used only in order to determine the country to which the call is made, and later carrying out the rating per constant pass having value per pass depending on the country to which the call is made.

RETURNING THE REMNANT COINS

If having coins in any of the slots, the user ends the communication or pushes the return key without having established a connection or if the connection is ended for external causes (FIG. 5b), the device will return said coins immediately. The return is executed by the microcontroller (MC), which commands the motor to advance to the coin storage to its limiting position in which there exists a limit point which gives rise to the opening of all slots with the consequent falling of the coins inside which are guided to the return cash-box.

Once the user has activated the hung up switch situated on the microtelephone, the connection is terminated and the connection detection circuit (DEC) puts its output at logical zero, this fact is detected by the microcontroller which provokes the return of the coins not used and the supply to the mobile telephone will be cut-off. The remnant quantity resulting from non-consumption of the last charged coin will be shown on the screen. The device permits that said amount be used in a later communication for which the microcontroller (MC) starts a timing of 50 seconds during which the user should insert at least one coin, or start a new connection. If no coin is introduced nor a connection is started in that period, the remnant quantity is initialized to zero.

Figure 5E:
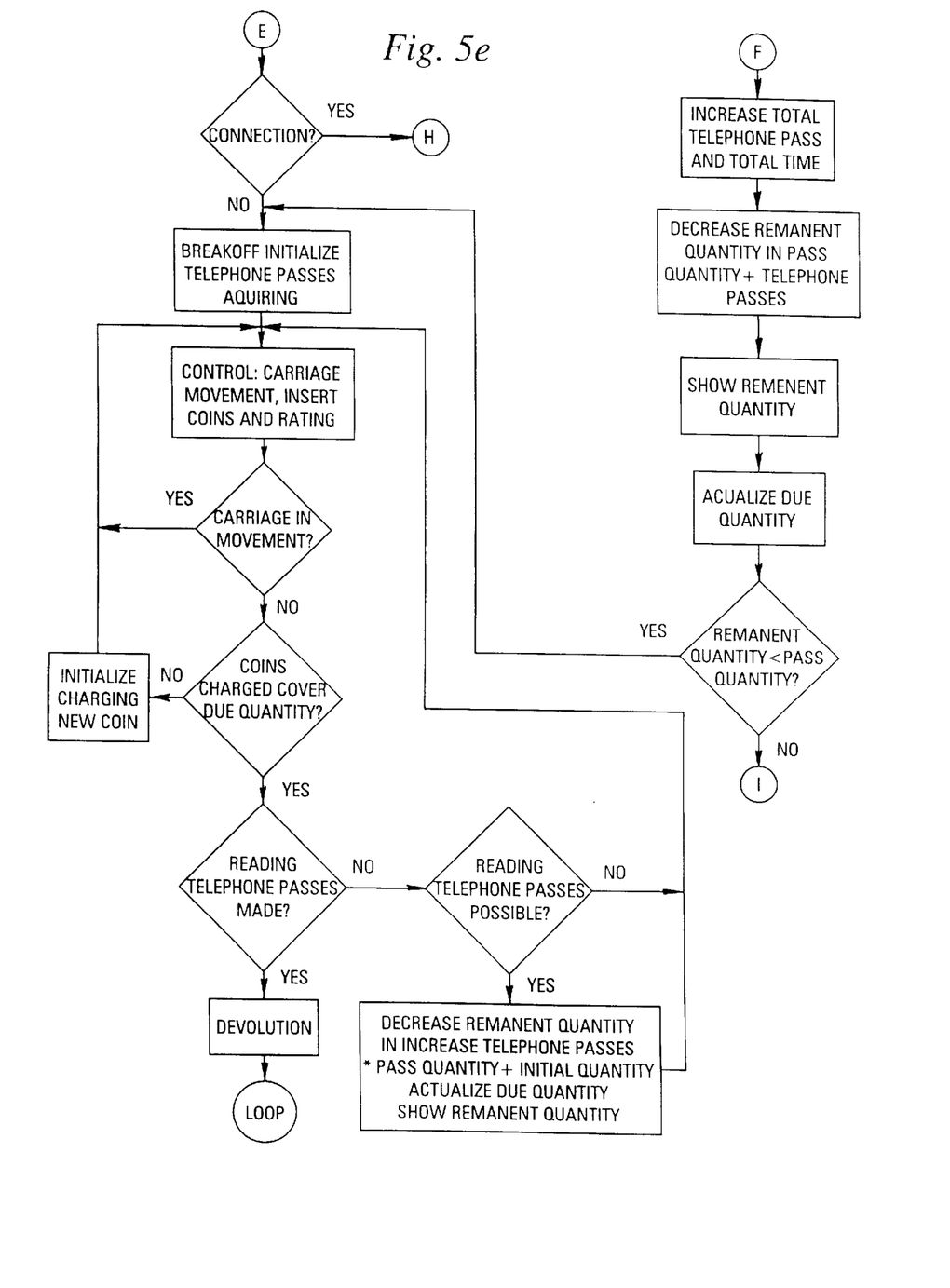

FIG. 5e shows the flowchart of the ending process of the communication and return of remnant coins.

REMOTE MONITORIZATION

Optionally a remote monitorization system for mechanical break-downs, full cash-box and the state of the auxiliary equipment is introduced in two versions: active and passive.

Passive version: the exploiting agent calls the mobile telephone of the rating device in order to determine the state of the same. This is based on the fact that when it is intended to accede to a mobile telephone which is shut-off an error message generated by the telephone company is produced which notifies that the terminal is out of order.

Therefore, in order to indicate that the system is in break-down state, or that the cash-box is full, the rating system will maintain the supply relay of the mobile telephone activated for which the error message will no longer be generated. In this manner, the message will only be produced in the case that there is neither mechanical break-down nor the cash-box is full, for which the exploiting agent will be able to determine the state of the system making periodic calls to the corresponding mobile telephone. The keyboard activation and blocking circuit (CABT) is used in this case for impeding the making of free calls by blocking the keyboard as long as the communication is not possible.

In order to prevent situations in which, having inserted coins, by receiving the monitorization call the rating system charges without having produced a communication, a mechanism is provided which consists of the activation of a monitorization period. Said activation occurs when the transceiver receives a call which is detected by the connection detection circuit (DEC), and provokes a blocking in the insertion of coins and in the returning switch for a period of one minute, impeding the making of calls during this time and permitting the exploiting agent to carry out the monitorization.

The algorithm corresponding to this process is the following:

If break-down
    Activate supply relay of the mobile telephone.
If end connection
If cash-box full
    Activate supply relay of the mobile telephone.
If there are no tones
If there had not been communication
    Timing of 1 minute before permitting the insertion of coins, initiating a new communication or activating the return switch.

Active Version: In this case it is the charging system itself which makes the monitorization calls when a mechanical break-down, the filling of the cash-box or the activation of any of the logic signals existing in the system and controlled by certain external auxiliary equipments to indicate a determined malfunctioning are produced. In the case where none of said condition exists, the monitorization calls are produced in a periodical form, indicating the collected amount until that moment.

The system should dial and send the telephone number with which the contact is being made. This dialing is made using the keyboard activation and blocking system (CABT). The telephone number will remain stored in the data memory or fixed through 9 rotative switches read by the microcontroller (MC). In the first case, the actualization of the number in memory will be done while the system is in VERIFICATION mode, and will be carried out by dialing the sequence of the corresponding digits in the microtelephone.

Once the communication with the dialed telephone is established, the interchange of information is carried out using multifrequency tones (according to CCITT norms). The system will generate tones through dialing the corresponding numbers made with CABT. For receiving and decoding the tones transmitted from the exterior, the system should have a multifrequency tone decoder circuit (CDTMF), which will detect said tones through its analogic input, generating in its output BCD codes corresponding to the received numbers which will be read by the microcontroller.

The process will be the following: once the break-down situation, the filling of the cash-box, the detection of a logical 1 in a digital input of monitorization, or the termination of the monitorization and the communication in process is produced, the system enters in a blocking period in which the insertion of coins the use of the return switch and the beginning of new calls are impeded.

The system will then proceed to dial the contact number and send the same. From this moment an interchange of information between the exterior and the charging system is produced in which the exterior is informed of the state of break-down or not, of the amount collected until that moment and the state of the digital signal of monitorization. On the other hand the charging system is informed of the new value of the period of monitorization and the new contact telephone number, if applicable.

The corresponding algorithm will be:

If end communication

If (break-down or full cash-box or monitorization period ended or any monitorization input activated) and end communication.

Block insertion of coins, starting a new communication and the activating of the return switch.

Dial and send contact number by means of CABT.

send to the exterior information relative to the state of break-down, accumulated quantity and the value of monitorization signals by means of CABT.

Receiving information from the exterior of the new, contact telephone number and the new monitorization period, through CDTMF.

Having sufficiently described the nature of the present invention, as well as one way of putting it into practice, it only remains to be added that it is possible to introduce changes of form, material and disposition in the whole invention or in part of which it is composed of, as long as said changes do not substantially vary the characteristics of the invention claimed as follows:

I claim:

1. A coin charging system for mobile telephony, of the type used in order to facilitate making calls with mobile telephones by means of charging coins and being provided with display means for displaying information and power supply means for providing power to the system comprising, a control subsystem operatively connected to a coin selecting and charging subsystem, the coin charging system being able to operate as a rating device, being able to change initial and quantity per pass ratings and being able to monitor the collected amount of coins, the total communication time of the call, the total connection time until the communication is started, the total number of calls, the total number of passes of the telephone company, and to zero the quantities.

2. The coin charging system of claim 1 wherein the control subsystem comprises a microcontroller with corresponding interfaces for digital input/output, the interfaces for the outputs of photoelectric sensors being received from a coin charging and return mechanism and coming from a user control unit, the microcontroller being operatively connected to circuitry for processing the signals coming from the mobile telephone including an interface for audio signals, the interface containing a squaring amplifier to condition the audio signal received by a microtelephone, a high order band pass filter, an analog switch for the audio signal transmitted by the microtelephone, a connection detection circuit for determining the moment in which the mobile telephone enters a connection, a keyboard activation and blocking circuit for acting on the signal of the transmission data conductor, a multifrequency tone detection circuit connected to the audio signal received by the microtelephone, an interface for the rating signal of the telephone company received through a data control conductor terminal, a supply relay and auxiliary circuitry thereof, auxiliary electronics for the operation of the motor for the carriage movement and the charging coil of the coin mechanism and interfaces for the signals received from the coin selector.

3. The coin charging system of claim 1 wherein the control subsystem is connected to a user control unit, a coin mechanism, a coin selector, a mobile telephone and the display subsystem.

4. The coin charging system of claim 2 including a mechanism for receiving, storing and charging coins, the positioning of the mechanism being achieved through the use of a series of phototransistors of rough and precise positioning.

5. The coin charging system of claim 1 wherein the user control units include a first switch of three positions, permitting the selecting of the operation mode, a second switch of two positions, permitting the selecting of the initial and quantity per pass rates to be modified and the accumulated amount desired to be displayed, two push buttons for increasing and decreasing the rate and zeroing and displaying the accumulated quantities, one of the positions of the second switch permitting the display of the total number of telephone company passes.

6. The coin charging system of claim 2 wherein the coin selector generates a signal code for each type of coin received, said signal being detectable by the microcontroller.

7. The coin charging system of claim 3 including a plurality of options for detecting the beginning of the rating process.

8. The coin charging system of claim 7 including keyboard blocking means for blocking the communication through the keyboard during the delay existing from the beginning of the communication to the detection of the same by the charging system.

9. The coin charging system of claim 4 wherein the coin mechanism includes a motor for advancing a storage unit into a limiting position so as to provoke the coins contained therein to be guided to a return cash box.

10. The coin charging system of claim 9 including remote monitoring means for monitoring the status of the system.

11. The coin charging system of claim 1 wherein the control subsystems in communication with a means for reading and recording to intelligent chip cards, the subsystem reading the amount of accumulated money on the card and recording the remnant amount at the conclusion of the cell through a communication port connected to the system.

12. A method of mobile telephony coin charging comprising the steps of:
   a) operating the system as a rating device through a NORMAL mode;
   b) changing the initial and per pass ratings through the use of a RATING mode; and
   c) monitoring the collected amounts of coins, the total communication time, the total connect time until the communication is started, the total number of calls, the total number of passes of the telephone company and zeroing said quantities through the use of a VERIFICATION mode.

13. The method of mobile telephony coin charging as recited in claim 12 comprising the further step of detecting the beginning of a rating per constant pass, comprising the steps of:
   a) detecting the start of the communication with a microcontroller and a connection detection circuit, an interface of audio signals, and a transceiver,
   b) filtering the audio signal generated by the transceiver and received by the microcontroller,
   c) generating a signal by the interface of audio signal, such as a square wave amplifier, with a frequency coinciding with the fundamental frequency of the audio signal received by the transceiver, said generated signal being readably by the microcontroller,
   d) microprocessing the sampled values of the signal, and applying a digital filter thereto,
   e) marking the maximum value of separation between tones to detect the start of the communication, and
   f) charging the call per constant pass.

14. The method of mobile telephony coin charging as recited in claim 12 comprising the further step of detecting the beginning of a rating per constant pass, comprising the steps of:

a) establishing the beginning of the communication by initial rating passes received from the Telephone Company by the transceiver, b) determining the quantities to be charged during the calls made using the subsequent rating passes received, c) reading the information related to the passes by a microcontroller through interface terminals located between the transceiver and the microtelephone.

15. The method of mobile telephony coin charging as recited in claim 14 including the step of impeding the making of free calls due to the existing delay between the beginning of the communication and the detection of the same by the charging system comprising the steps of:

a) detecting the calling tone of the telephony system, b) blocking the keyboard by means of a keyboard activation and blocking circuit in the periods in which a tone is not detected, c) unblocking the keyboard during the time the tone is detected, d) unblocking the keyboard when the beginning of the communication is detected.

16. The method of mobile telephony coin charging as recited in claim 13 including the further steps of a) having the microcontroller command a motor to advance a storage unit to its limiting position, b) opening all the slots of the system, c) provoking the coins contained therein to the return cash box.

17. The method of mobile telephony coin charging as recited in claim 16 including the further steps of calling the mobile telephone included within the system to remote monitor the system's status.

18. The method of mobile telephony coin charging as recited in claim 16 including the step of having the mobile telephone contact another telephone when the coin charging system's operation is no longer normal.

19. The method of mobile telephony coin charging as recited in claim 12 including the further step of reading an intelligent chip card to determine the accumulated money on the card.

20. The method of mobile telephony coin charging as recited in claim 19 including the further step of recording the remnant of money on the intelligent chip card at the conclusion of the call.

* * * * *